United States Patent Office 3,227,247
Patented Jan. 4, 1966

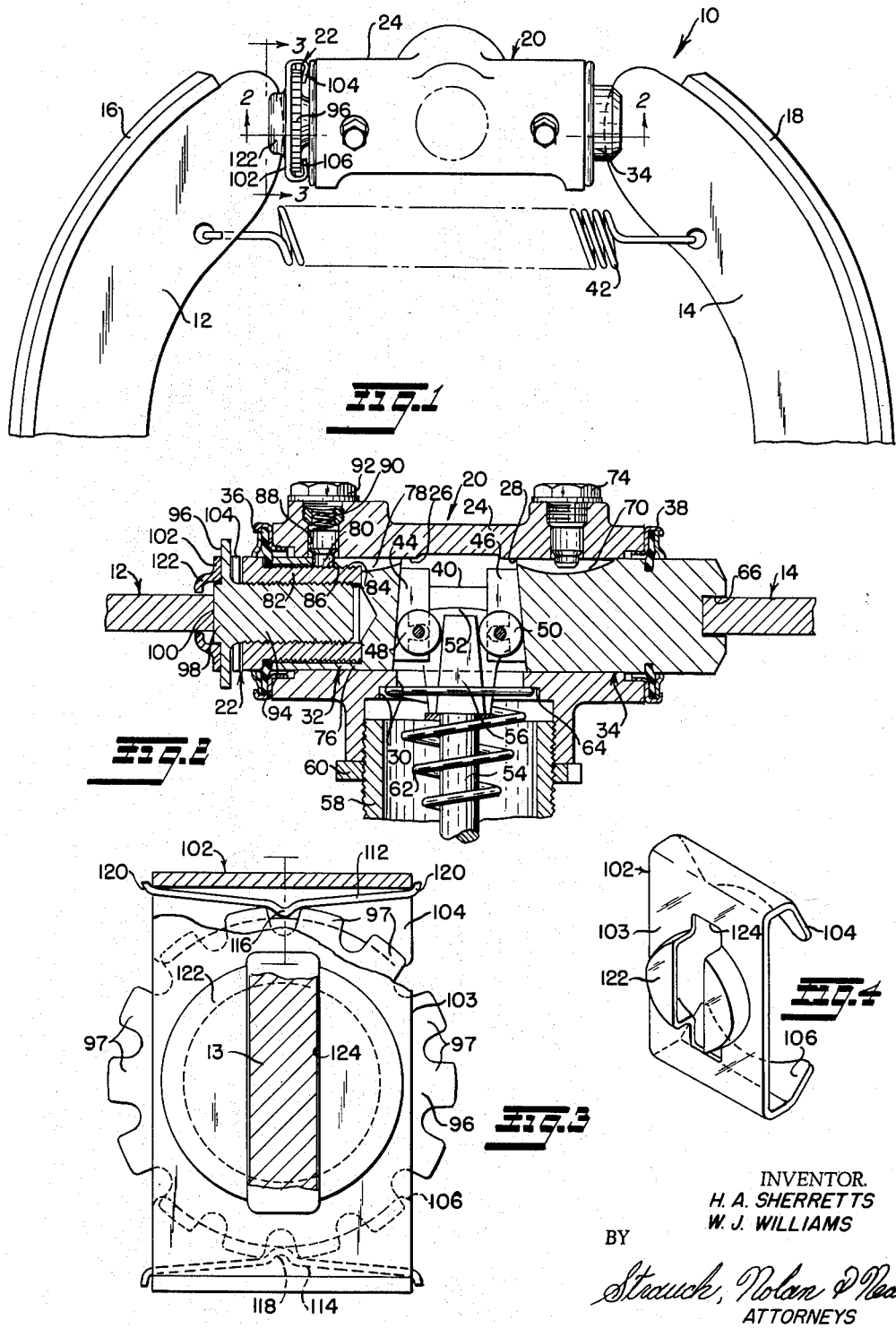
INVENTOR.
H. A. SHERRETTS
W. J. WILLIAMS
ATTORNEYS

3,227,247
BRAKE MECHANISMS
Howard A. Sherretts, Linesville, Pa., and William J. Williams, Ashtabula, Ohio, assignors, by mesne assignments, to Rockwell-Standard Corporation, a corporation of Delaware
Filed Feb. 10, 1964, Ser. No. 343,696
2 Claims. (Cl. 188—79.5)

The present invention refers to brake mechanisms and more particularly to actuating mechanisms for internally expanding drum type automotive brakes.

In drum type automotive brakes in which the brake shoes are engaged with the drum by plungers moving in opposite directions when actuated by hydraulic or mechanical means, the web ends of the brake shoes must be securely supported on the plungers to position the brake shoes properly and to hold the plungers against rotation.

United States Patent No. 3,037,584 to F. T. Cox et al. discloses a mechanical plunger type brake actuator in which the plungers are displaced outwardly by means of a wedge and roller mechanism acting on the plungers. A further improved version of this type brake mechanism is disclosed in application Serial No. 286,038 filed June 6, 1963 for Vehicle Brake Systems. In the latter, one of the plungers is equipped with an automatic adjustment mechanism of a type disclosed in detail in United States Patent No. 3,068,964 to vary the effective length of the plunger to compensate for brake shoe lining wear.

In this adjusting mechanism the adjustable plunger comprises a stud threaded into an adjusting nut carried by a plunger member. The adjusting nut may be rotated manually or by a ratchet mechanism to cause the inner stud which contacts the brake web to be displaced outwardly thus varying the effective length of the plunger assembly.

In the past, difficulties had been encountered to so secure the brake shoe on the adjustable plunger that the inner stud may be rotated for manual adjustment and yet be held against rotation when the adjusting nut rotates during automatic adjustment.

In the present invention a novel brake shoe securing means is provided for the adjustable plunger to position the brake shoe securely and to allow manual adjustment and to assure proper operation of the automatic adjustment mechanism.

Accordingly, it is an important object of the present invention to provide an improved and simplified brake shoe locating and securing means in a plunger actuated brake mechanism.

Another object of the present invention is to provide in an adjustable plunger assembly in a brake mechanism, an improved brake shoe securing means which prevents the rotation of the extensible part of the plunger during automatic adjustment but permits rotation thereof for manual adjustment.

It is a further object to provide an improved mechanism for connecting the brake shoe web to the actuating plunger assembly which is of simplified construction, and which reduces the number of parts required in the assembly and reduces the cost of the parts.

Other objects and novel features will become evident as the description proceeds with reference to the accompanying drawings in which:

FIGURE 1 is a plan view of the actuating half of a brake mechanism according to the present invention;

FIGURE 2 is a section through the actuator along line 2—2 of FIGURE 1;

FIGURE 3 is an enlarged section taken along line 3—3 of FIGURE 1; and

FIGURE 4 is a perspective view of the shoe retainer clip alone.

With reference to FIGURE 1 there is shown a brake shoe and actuator assembly 10 such as may be normally employed in automotive drum type brakes. In this instance the assembly consists of opposite brakes shoes 12 and 14 having brake linings 16 and 18 respectively. The brake shoes may be connected at one or both ends by an actuator 20 or, the other ends of the brakes shoes (not shown) may be pivotally anchored as is common practice.

The actuator 20 is provided with an adjusting mechanism 22 to compensate for brake lining wear. When the brake mechanism 10 is equipped with actuators at both ends of the brake shoes (as in FIGURE 1 of Patent 3,037,584) one adjusting mechanism will be provided at each actuator in diagonal opposite position to adjust both brake shoes 12 and 14 independently of each other. However, when only one actuator is provided and the brake shoes are anchored at the other end (as in FIGURE 15 of said Patent 3,037,584), the actuator is provided with two adjusting mechanisms one each between actuator 20 and brake shoe 12 and between actuator 20 and brake shoe 14, as will be clearly understood by persons skilled in the art. In any case, the actuators 20 and adjusting mechanisms 22 will be identical and it will therefore suffice to describe only one of them.

With further reference to FIGURE 2 the actuator 20 comprises a housing 24 which may be integral with or attached to a brake spider or support (not shown) as disclosed in Patent 3,037,584. Housing 24 is provided with aligned bores 26 and 28 which are intersected at the center of the housing by a stepped bore 30 normal to bores 26 and 28. Bores 26 and 28 receive reciprocating plungers 32 and 34, respectively, extending outwardly thereof in abutting engagement with the brake shoes 12 and 14 respectively. The outer end of the bores 26, 28 are sealed by diaphragm type seals 36 and 38 securely attached to the housing 24 and the plungers 32, 34 respectively to prevent the entrance of foreign matter into the housing 24.

When the plungers 32, 34 are retracted thei rinner ends abut against a central raised boss portion 40 within the housing 24. The brake shoes 12 and 14 are normally retracted by the return spring 42 to press the plungers 32, 34 inwardly against the boss 40.

The inner ends of the plungers 32, 34 are slotted transversely as at 44 and 46 respectively, the slots being inclined inwardly in a converging direction towards each other. The plunger slots 44, 46 are adapted to receive rollers 48 and 50 respectively which are rotatably secured within a bifurcated cage 52 attached to a pushrod 54. The lower end of the pushrod 54 is provided with a wedge extension 56 which extends into the roller cage 52 and between the rollers 48 and 50. The opposite faces of the wedge 56 are inclined at an angle corresponding to the angle of inclination of the plunger slots 44 and 46. This wedge and roller actuating mechanism is disclosed in detail in the aforementioned Patent 3,037,584.

The pushrod 54 and part of the wedge 56 and roller cage 52 extend outwardly through bore 30 and into a tubular adapter housing 58 threaded into the actuator housing 24 and secured thereto by a large locknut 60. The adapter housing 58 may be attached to a hydraulic or air pressure motor or mechanical lever linkage (not shown) as disclosed in Patent 3,037,584 to reciprocate pushrod 54 when actuated. A coil spring 62 attached at one end to the outer end of the pushrod 54 (not shown) and seating at its other end in a counterbored portion 64 of the bore 30 normally tends to urge the pushrod 54 outwardly retracting the wedge and roller assembly sufficiently to allow the plungers 32 and 34 to abut against the anchor boss 40.

When the pushrod 54 is forcibly displaced inwardly of housing 24 by either of the aforementioned operator means (not shown) the wedge and roller assembly 48, 50, 56 is displaced inwardly causing the rollers 48, 50 to roll up on the inclined surfaces of the plunger slots 44 and 46 thereby forcing plungers 32 and 34 oppositely outwardly of housing 24 to move the associated brake shoes 12 and 14 apart against the force of the return spring 42 to contact an associated brake drum (not shown).

The plunger 32 is adjustable to vary its effective length whereas the plunger 34 may be non-adjustable. In this instance the outer end of the plunger 34 is slotted as at 66 to receive the end of the web of brake shoe 14 which is held in the slot by the return spring 42. To prevent the plunger 34 from rotating within bore 28 it is axially slotted at 70 to receive a screw 74 threaded into the actuator housing 24.

The adjustable plunger 32, in this instance, embodies an adjusting mechanism 22 of a type disclosed in detail in Patent 3,068,464 and which includes an axially slidable plunger member 76 held against rotation by a dog 80 which extends into a slot 78. Member 76 receives an inner adjusting nut 82 which is rotatable relative to member 76 under certain conditions as will be explained. Adjusting nut 82 is provided with spiral teeth 84 on its outer surface which are engaged by the spiral teeth 86 of dog 80. Dog 80 is resiliently supported within an aperture 88 in housing 24 by a spring 90 held in place by a cap screw 92.

Threaded into the adjusting nut 82 is an adjusting stud 94 provided with a star wheel 96 by which the stud 94 may be manually rotated in or out of nut 82. With further reference to FIGURES 3 and 4 the outer end of stud 94 has a central boss portion 98 having a flat bearing surface 100 against which the end of web 12 abuts.

Surrounding the star wheel 96 is a generally rectangular clip 102 formed of sheet metal. The ends 104 and 106 of the longer side of the clip 102 are bent into substantially U-shaped forms to extend over and behind the star wheel 96 as shown in FIGURE 1. The spaces between the U-bends and the edge of the star wheel 96 is occupied by leaf springs 112 and 114 respectively extending transversely across the smaller side of the clip 102. The springs are prestressed and bent at their center towards the star wheel 96 against which they resiliently abut and are provided at the center with protrusions 116 and 118 respectively which extend into the space between two adjacent teeth 97 of the star wheel 96. Thus, the springs 112 and 114, normally prevent the star wheel 96 from turning. At the same time, due to the opposite position of the springs 112, 114, the clip 102 is accurately centered in relation to the star wheel 96. The free ends of the springs extend beyond the sides of the clip and are bent at 120 to hold them against longitudinal displacement. The detent provided by the springs may also be provided by a spring loaded ball or other conventional mechanisms.

The center of the clip 102 is pressed outwardly from its generally flat base portion 103 to provide a circular boss 122 which is slotted at 124 longitudinally of the clip. The slot 124 extends into the flat base portion 103 of the clip on both sides of the boss 122 and is adapted to receive the end of the web of brake shoe 12 which extends into the slot and abuts against the flat surface 100 of the boss 98 on the stud 94 (see FIGURE 2). Thus, the brake shoe 12 is held against lateral shifting movement in the slot 124 allowing, however, rotational movement of the star wheel 96 upon manual adjustment which can be accomplished by turning the star wheel with a tool inserted between the teeth of the star wheel. The resisting force of the springs 112 and 114 is overcome so that the star wheel can be turned until the detent 116, 118 of the springs snap into a next space between the teeth 97. The brake shoe 12 is then moved the same distance as the stud 94 advances.

As shown in FIGURES 2 and 4 the round boss 122 on clip 102 fits closely around the boss 98 on stud 94. The brake shoe web is thus accurately positioned and centered in coaxial relation with the stud 94, to assure proper operation of the brake.

The operation of the automatic adjustment will now be described. When the plungers 32, 34 are displaced outwardly upon actuation of the roller and wedge mechanism as described earlier, the adjusting dog 80 rides up on the spiral teeth 84 of the adjusting nut 82. The size and the spiral angle of the teeth 84 are selected so that the dog will only ride up on the teeth but will not disengage from the teeth under normal braking operation, that is, these values are proportional to the predetermined clearance between the brake shoe lining and the brake drum. However, when the lining is worn the plunger 32 must travel a greater distance outwardly causing the teeth of the dog to fall into the next group of teeth. Upon return movement of the plunger 32 inwardly the dog 80 which now is fully engaged with the spiral teeth causes the adjusting nut 82 to turn, thereby advancing the stud 94 outwardly due to its threaded connection therewith.

Prior to the present invention, the friction between the threads of the adjusting nut 82 and stud 94 was frequently so great as to tend to turn the stud with the nut 82 thus eliminating the effect sought to be obtained and no adjustment or insufficient adjustment was made. However, the present novel shoe retainer cup and spring assembly 102, 112, 114, effectively prevents rotation of the stud 94 due to its spring lock at the star wheel 96. The friction between the threads of the stud 94 and nut 82 will never be sufficient to overcome the force of the springs 112, 114 which hold the star wheel 96 against inadvertent rotation.

Thus, an effective novel brake shoe retainer and positioning means has been provided which at the same time prevents the adjusting stud 94 from undesired rotation during automatic adjustment operation and provides a clicker spring type escapement for manual adjustment.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A brake assembly comprising a pair of brake shoes adapted to engage a surrounding brake drum, a housing having aligned openings, plunger assemblies guided for rectilinear movement in said openings and adapted when urged apart to urge said shoes toward said drum, an adjusting nut received in one of said plunger assemblies, said adjusting nut having a threaded bore, means for automatically rotating said adjusting nut when the travel of said plunger assembly between brake disengaged and brake engaged positions exceeds a predetermined amount, a stud threaded into said adjusting nut, a star wheel rigid with said stud adjacent the outer end thereof, means forming a cylindrical extension on said stud projecting beyond said starwheel, a locking member extending across said flat outer end surface of said stud, said locking member having a cylindrical recess fitting around said cylindrical extension to prevent lateral shifting movement of said locking member with respect to said stud while permitting relative rotation between said locking member and said stud, the ends of said locking member extending around the periphery of said star wheel, spring means carried by said locking member and engageable with said star wheel to releasably lock said stud against rotation with respect to said locking member, said locking member having a diametral slot for the reception of the end of said brake shoe thereby locking said one brake shoe against lateral shifting movement with respect to said stud.

2. A brake assembly comprising a pair of brake shoes adapted to engage a surrounding drum, a housing having aligned openings, plunger assemblies guided for rectilinear movement in said openings and adapted, when urged apart, to urge said shoes toward said drum, at least one of said plunger assemblies having a threaded bore, a stud threaded into said bore, a starwheel rigid with said stud adjacent the outer end thereof, said stud having a reduced cylindrical extension projecting beyond said starwheel, said extension having a flat outer end surface directly engageable by one of said brake shoes whereby said stud may rotate with respect to said one brake shoe, and a locking member having a cylindrical recess fitting around said cylindrical extension to prevent lateral shifting movement of said locking member with respect to said stud while permitting relative rotation between the parts, the ends of said locking member extending around the periphery of said starwheel, means carried by said locking member and engageable with said starwheel to releasably lock said starwheel against rotation with respect to said locking member, said locking member also having a diametral slot for the reception of the end of said one brake shoe whereby the end of said one brake shoe holds said locking member against rotation and said locking member holds said brake shoe against lateral shifting movement.

References Cited by the Examiner

UNITED STATES PATENTS 2,924,307   2/1960   Winston et al. _____ 188—196
3,068,964   12/1962  Williams et al. _____ 188—79.5

MILTON BUCHLER, *Primary Examiner.*

DUANE A. REGER, *Examiner.*